US 12,476,628 B2

(12) United States Patent
Chen et al.

(10) Patent No.: US 12,476,628 B2
(45) Date of Patent: Nov. 18, 2025

(54) CONSTANT CURRENT OUTPUT CIRCUIT CONFIGURED FOR MICRO-CURRENT AND MICRO-CURRENT SHOWER HEAD

(71) Applicant: Xiamen Solex High-Tech Industries Co., Ltd., Fujian (CN)

(72) Inventors: Boren Chen, Fujian (CN); Shuangjiu Wang, Fujian (CN); Jianan Li, Fujian (CN); Lian Zhang, Fujian (CN)

(73) Assignee: Xiamen Solex High-Tech Industries Co., Ltd., Xiamen (CN)

( * ) Notice: Subject to any disclaimer, the term of this patent is extended or adjusted under 35 U.S.C. 154(b) by 291 days.

(21) Appl. No.: 18/112,727

(22) Filed: Feb. 22, 2023

(65) Prior Publication Data
US 2023/0275574 A1 Aug. 31, 2023

(30) Foreign Application Priority Data
Feb. 28, 2022 (CN) .......................... 202210191649.0

(51) Int. Cl.
*H03K 17/06* (2006.01)
*H03K 19/00* (2006.01)
(52) U.S. Cl.
CPC ....... *H03K 17/063* (2013.01); *H03K 19/0016* (2013.01)
(58) Field of Classification Search
CPC .................. H03K 17/063; H03K 19/0016
See application file for complete search history.

(56) References Cited

U.S. PATENT DOCUMENTS

| 5,804,957 | A | 9/1998 | Coln | |
|---|---|---|---|---|
| 9,783,964 | B2 * | 10/2017 | Thompson | G05B 15/02 |
| 10,693,436 | B2 * | 6/2020 | Kim | H03H 11/30 |
| 2012/0153930 | A1 * | 6/2012 | Goto | H03K 17/725 |
| | | | | 323/311 |

(Continued)

FOREIGN PATENT DOCUMENTS

| JP | 2003219973 A | 8/2003 |
|---|---|---|
| JP | 2014033950 A | 2/2014 |

(Continued)

OTHER PUBLICATIONS

KR Office Action cited in KR10-2022-0188662, mailed Apr. 12, 2024, 6 pages.

(Continued)

*Primary Examiner* — Menatoallah Youssef
*Assistant Examiner* — Khareem E Almo
(74) *Attorney, Agent, or Firm* — Cooper Legal Group, LLC (57) ABSTRACT

A constant current output circuit configured for a micro-current comprises a voltage boosting module and a logic controller. An input terminal of the voltage boosting module is connected to a power source, and an output terminal of the logic controller is connected to the input terminal of the voltage boosting module. The logic controller is configured to compare a sample voltage generated by the micro-current on a sampling resistor with a first threshold voltage, and when the sample voltage is less than the first threshold voltage, the logic controller drives the voltage boosting module to boost an output voltage until the sample voltage is increased to be greater than the first threshold voltage.

18 Claims, 6 Drawing Sheets

(56) References Cited

U.S. PATENT DOCUMENTS

| | | | |
|---|---|---|---|
| 2013/0335114 A1* | 12/2013 | Chen .................... | G11C 29/025 |
| | | | 716/100 |
| 2015/0309090 A1* | 10/2015 | Akahane .......... | G01R 19/16547 |
| | | | 324/537 |
| 2016/0258997 A1* | 9/2016 | Tang ................... | H04L 25/0278 |
| 2016/0259385 A1* | 9/2016 | Tang ................... | G06F 13/4072 |
| 2017/0154668 A1* | 6/2017 | Ha ....................... | G11C 29/021 |
| 2017/0168746 A1* | 6/2017 | Kwon .................... | G11C 5/04 |
| 2018/0158495 A1* | 6/2018 | Jeon .................... | G11C 29/028 |
| 2019/0081609 A1* | 3/2019 | Kim ........................ | H03H 7/40 |
| 2019/0184410 A1* | 6/2019 | Luo .......................... | A61N 1/44 |

FOREIGN PATENT DOCUMENTS

| | | |
|---|---|---|
| JP | 2015519177 A | 7/2015 |
| JP | 2019107444 A | 7/2019 |

OTHER PUBLICATIONS

KR Office Action cited in KR10-2022-0188662, mailed Jan. 7, 2025, 17 pages.

JP Decision to Grant cited in JP2022-198726, mailed Aug. 6, 2024, 5 pages.

JP Office Action cited in JP2022-198726, mailed Apr. 23, 2024, 8 pages.

JP Search Report cited in JP2022-198726, mailed Apr. 17, 2024, 38 pages.

* cited by examiner

CONSTANT CURRENT OUTPUT CIRCUIT CONFIGURED FOR MICRO-CURRENT AND MICRO-CURRENT SHOWER HEAD

RELATED APPLICATIONS

This application claims priority to Chinese patent application number 202210191649.0, filed on Feb. 28, 2022. Chinese patent application number 202210191649.0 is incorporated herein by reference.

FIELD OF THE DISCLOSURE

The present disclosure relates to a constant current output circuit, and in particular to a constant current output circuit configured for a micro-current.

BACKGROUND OF THE DISCLOSURE

In order to improve a texture of skin, many types of beauty instruments are available on the market. The beauty instruments are usually driven by an external power supply, such as a battery, to drive a body to move, so as to massage skin and achieve a beauty effect.

However, the existing beauty instruments need an external power supply to work (i.e. the beauty instrument needs to be provided with the external power supply to operate). Therefore, most beauty instruments are used in an environment away from water. Even if the beauty instrument is driven by a battery with additional water-tight structures, there is still a risk of water ingress, and therefore the beauty instrument is only allowed to operate in environments with a small amount of water, and there is large degree of safety risk if used while showering.

In order to solve the problem, a micro-current shower head appears on the market, and a human body is used as a conductor, so that a micro-current stimulates and massages the skin of the human body through the human body, and the beauty effect is achieved. In the existing techniques, a microampere-level current is called a micro-current. However, the micro-current is not as small as possible, and the micro-current has to reach a certain value to work. The micro-current shower head in the existing techniques only simply connects a human body between a positive electrode and a negative electrode of a power supply, so that a situation where the micro-current is insufficient is likely to occur, and the beauty effect is not achieved.

BRIEF SUMMARY OF THE DISCLOSURE

The present disclosure provides a constant current output circuit configured for a micro-current which can achieve a micro-current constant current output and ensure that the micro-current acting on a human body is within an effective current value range.

In order to solve the technical problem, a first technical solution of the present disclosure is as follows.

A constant current output circuit configured for a micro-current comprises a voltage boosting module and a logic controller. An input terminal of the voltage boosting module is connected to a power source, and an output terminal of the logic controller is connected to the input terminal of the voltage boosting module. The logic controller is configured to compare a sample voltage generated by the micro-current on a sampling resistor with a first threshold voltage. When the sample voltage is less than the first threshold voltage, the logic controller drives the voltage boosting module to boost an output voltage until the sample voltage is increased to be greater than the first threshold voltage.

In a preferred embodiment, the constant current output circuit configured for the micro-current further comprises an external terminal. The external terminal comprises a first terminal connected to the output voltage and a second terminal connected to the sampling resistor, and the micro-current is generated when the first terminal and the second terminal are conductively connected together through an external conductive medium.

In a preferred embodiment, the constant current output circuit configured for the micro-current further comprises a resistance access detection module. The resistance access detection module is configured to compare the sample voltage with a second threshold voltage to judge whether the first terminal and the second terminal are electrically connected together through the external conductive medium.

In a preferred embodiment, the logic controller comprises a first comparator, and the resistance access detection module comprises a second comparator. Each of an output terminal of the first comparator and an output terminal of the second comparator is connected to an OR gate.

In a preferred embodiment, the constant current output circuit configured for the micro-current comprises an upper bound voltage detection module. The upper bound voltage detection module is configured to compare the output voltage with a third threshold voltage to judge whether the output voltage reaches an upper bound voltage.

In a preferred embodiment, the upper bound voltage detection module comprises a third comparator, and an output terminal of the third comparator is connected to the OR gate.

In a preferred embodiment, the logic controller is a single chip microcomputer. An input terminal of the single chip microcomputer is connected to the sample voltage, and an output terminal of the single chip microcomputer is connected to the voltage boosting module.

In a preferred embodiment, the input terminal of the single chip microcomputer is connected to the output voltage and is configured to compare the output voltage with a third threshold voltage to judge whether the output voltage reaches an upper bound voltage.

In a preferred embodiment, the constant current output circuit configured for the micro-current comprises an indicator light module. The indicator light module is connected to the output terminal of the logic controller. When the sample voltage is greater than the first threshold voltage, an indicator light of the indicator light module is turned on.

In a preferred embodiment, the indicator light module comprises a switch tube, and a control electrode of the switch tube is connected to the output terminal of the logic controller.

The present disclosure provides a micro-current shower head comprising a shower head body and a constant current output circuit configured for a micro-current for adjusting an output value of the micro-current. The constant current output circuit comprises a sampling resistor and a logic controller, and the sampling resistor is connected to an input terminal of the logic controller. An output terminal of the logic controller is connected to an input terminal of a voltage boosting module, and the logic controller is configured to compare a sample voltage generated by the micro-current on the sampling resistor with a first threshold voltage. When the sample voltage is less than the first threshold voltage, the logic controller drives the voltage boosting module to boost an output voltage.

In a preferred embodiment, the constant current output circuit is the constant current output circuit above-mentioned.

Compared with the existing techniques, the technical solution has the following advantages.

1. The present disclosure provides the constant current output circuit configured for the micro-current. A sampling resistor is provided, and the sample voltage of the sampling resistor is obtained through the logic controller. Whether a micro-current value is in an effective current value range is judged through a comparison between the sample voltage and a threshold voltage. When the micro-current value is not in the effective current value range, an output voltage is adjusted, and the micro-current is always output in the effective current value range.
2. The present disclosure provides the constant current output circuit configured for the micro-current, and the indicator light can be turned on only when micro-current reaches a constant current state, so that a user can clearly know that the micro-current acting on a human body is effective micro-current.

BRIEF DESCRIPTION OF THE DRAWINGS

FIG. 7 illustrates a cross-sectional view of a micro-current shower head in Embodiment 3 of the present disclosure.

DETAILED DESCRIPTION OF THE EMBODIMENTS

The present disclosure will be further described below in combination with the accompanying drawings and embodiments.

The following will clearly and completely describe the technical solutions in the embodiments of the present disclosure with reference to the accompanying drawings. Obviously, the described embodiments are only a portion of the embodiments of the present disclosure, and not all of the embodiments. Based on the embodiments of the present disclosure, all other embodiments obtained by those of ordinary skill in the art without creative work fall within the protection scope of the present disclosure.

In the description of the present disclosure, it should be noted that the terms "upper", "lower", "inner", "outer", "top/bottom", etc. indicate the orientation or positional relationship based on the orientation shown in the drawings. The positional relationship is only for the convenience of describing the present disclosure and simplifying the description, rather than indicating or implying that the pointed device or element must have a specific orientation, be constructed, and be operated in a specific orientation. Therefore, the positional relationship should not be understood as a limitation of the present disclosure. In addition, the terms "first" and "second" are only used for descriptive purposes and should not be understood as indicating or implying relative importance.

In the description of the present disclosure, it should be noted that the terms "installed", "provided with", "sleeved/connected", "connected", etc., should be understood broadly. For example, "connected" can be a fixed connection, a detachable connection, or an integral connection, a mechanical connection, an electrical connection, a direct connection, or an indirect connection through an intermediate medium, and it can be a connection between two members. For those of ordinary skill in the art, the specific meaning of the above terms in the present disclosure can be understood under specific conditions.

Embodiment 1

Figure 1:
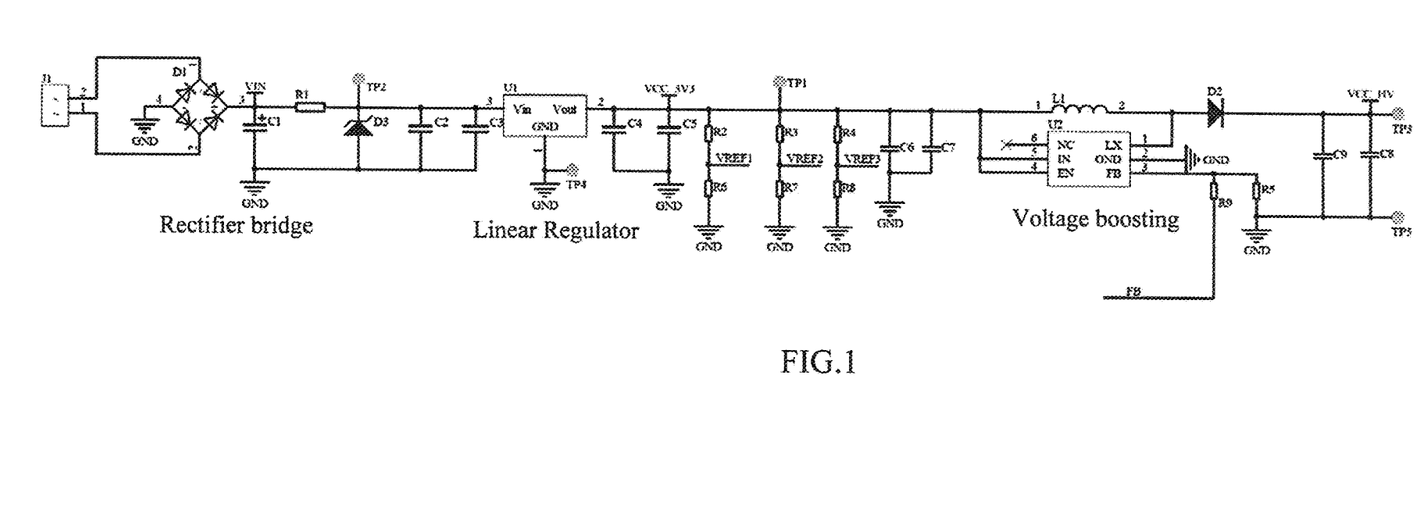
FIG. 1 illustrates a circuit diagram of a voltage boosting part of a constant current output circuit in Embodiment 1 of the present disclosure.
Figure 2:
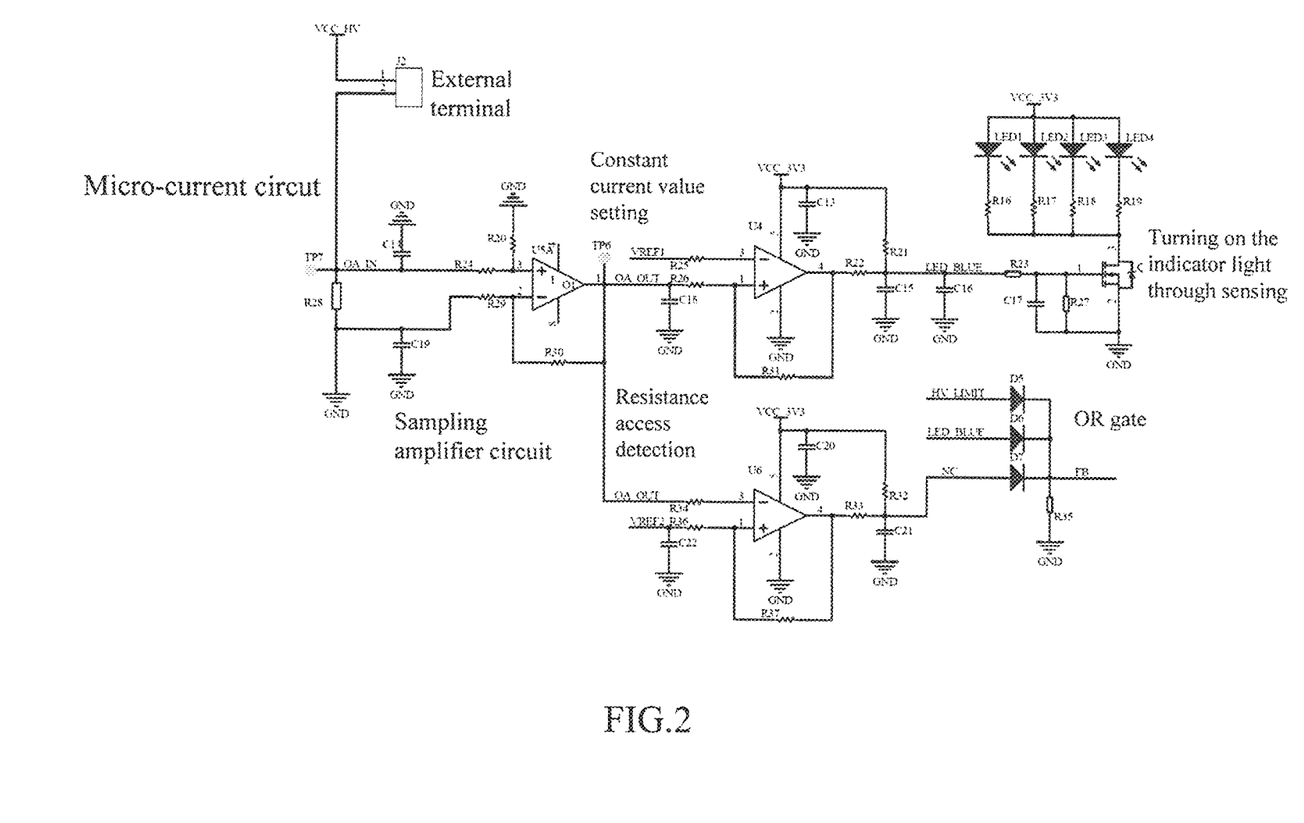
FIG. 2 illustrates a circuit diagram of a detection part of the constant current output circuit in Embodiment 1 of the present disclosure.
Figure 3:
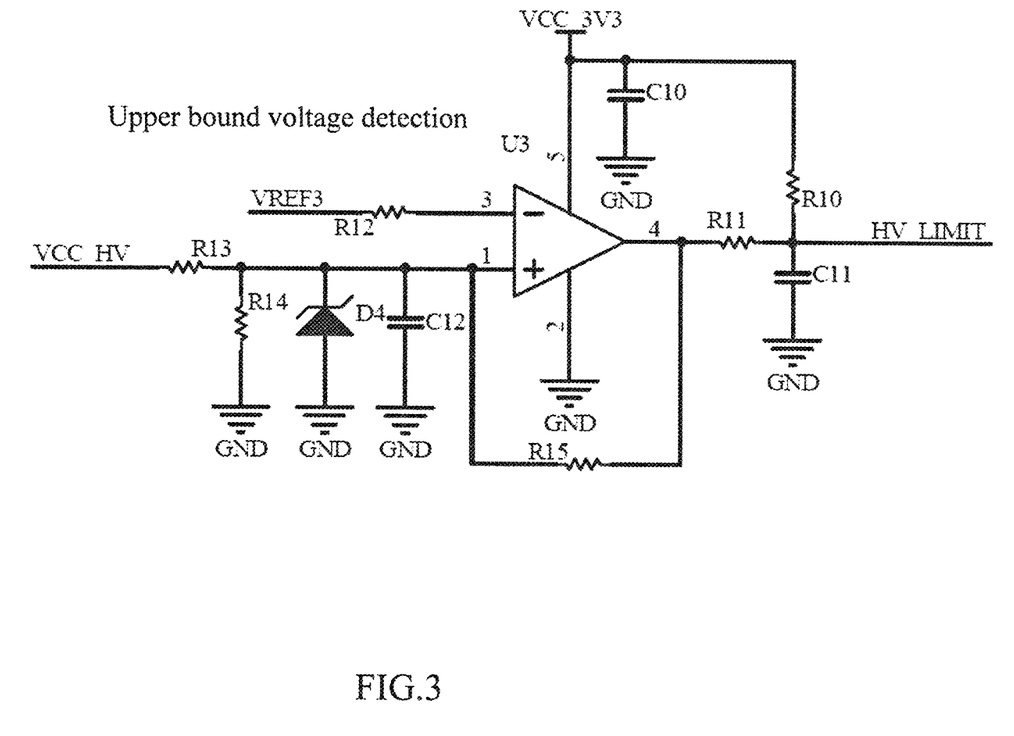
FIG. 3 illustrates a circuit diagram of an upper bound voltage detection part of the constant current output circuit in Embodiment 1 of the present disclosure.

Referring to FIGS. 1 to 3, the present disclosure provides a constant current output circuit configured for a micro-current, and the constant current output circuit comprises a rectification module, a voltage boosting module U2, and a logic controller. In this embodiment, utility power is used as a power source, and therefore, the rectification module is required. If a direct current power supply such as a lithium battery is used as the power supply, the rectification module can be eliminated.

An input terminal of the rectification module is connected to the power supply, an output terminal of the rectification module is connected to an input terminal of the voltage boosting module U2, and an output terminal of the logic controller is connected to an output terminal of the boosting module U2. The logic controller is configured to compare a sample voltage generated by the micro-current on a sampling resistor R28 with a first threshold voltage VREF1, and when the sample voltage is less than the first threshold voltage VREF1, the logic controller drives the voltage boosting module U2 to boost an output voltage VCC HV until the sample voltage is increased to be greater than the first threshold voltage VREF 1.

In order to realize the micro-current, the present embodiment further provides an external terminal J2. The external terminal J2 has a first terminal connected to the output voltage VCC HV and a second terminal connected to the sampling resistor R28. The first terminal and the second terminal generate the micro-current when the first terminal and the second terminal are conductively connected together through an external conductive medium.

In this embodiment, in order to better compare the sample voltage with the first threshold voltage VREF1, the logic controller comprises an operational amplifier U5A and a first comparator U4. A non-inverting input terminal+of the operational amplifier U5A is connected to one end of the sampling resistor R28 through a resistor R24, and an inverting input terminal—of the operational amplifier U5A is connected to the other end of the sampling resistor R28 through a resistor R29. When the micro current passes through the sampling resistor R28, a voltage on the sampling resistor R28 is OA_IN. The OA_IN is amplified to OA_OUT through the operational amplifier U5A, and an amplification factor is R30/R29, so that the sample voltage is obtained.

An output terminal of the operational amplifier U5A is connected to a non-inverting input terminal+of the first comparator U4, and an inverting input terminal—of the first comparator U4 is connected to the first threshold voltage VREF 1.

The embodiment further provides a resistance access detection module, and the resistance access detection module is configured to compare the sample voltage with a second threshold voltage VREF2 to judge whether the first terminal and the second terminal are electrically connected together through the external conductive medium.

Specifically, the resistance access detection module comprises a second comparator U6. An inverting input terminal—of the second comparator U6 is connected to the sample voltage, and a non-inverting input terminal+of the second comparator U6 is connected to the second threshold voltage VREF 2. An output terminal of the first comparator U4 and an output terminal of the second comparator U6 are respectively connected to an OR gate.

The embodiment further provides an upper bound voltage detection module. The upper bound voltage detection module is configured to compare the output voltage VCC HV with a third threshold voltage VREF3 to judge whether the output voltage VCC HV reaches an upper bound voltage. Specifically, the upper bound voltage detection module comprises a third comparator U3, and an output terminal of the third comparator U3 is connected to the OR gate.

When working, the following situations are presented.
1) When a human body resistor (i.e., a human body) is not connected, the first threshold voltage VREF1>OA_OUT, and the second threshold voltage VREF2>OA_OUT, so that the first comparator U4 outputs a low level signal and the second comparator U6 outputs a high level signal to enable the OR gate to output a high level signal VFB. At this time, the voltage boosting module U2 does not boost the output voltage VCC HV.
2) When the human body resistor is connected (i.e., the resistance is increased), the first threshold voltage VREF1>OA_OUT, and the second threshold voltage VREF2<OA_OUT, so that the first comparator U4 and the second comparator U6 respectively output a low level signal to enable the OR gate to output a low level signal. At this time, the voltage boosting module U2 continuously works to enable the micro-current in a micro current circuit to be continuously increased.
3) When a current in the human body resistor reaches a constant current value, the first threshold voltage VREF1<OA_OUT, and the second threshold voltage VREF2<OA_OUT, so that the first comparator U4 outputs a high level signal and the second comparator U6 outputs a low level signal to enable the OR gate to output the high level signal VFB. At this time, the voltage boosting module U2 does not work, and the micro current circuit keeps outputting the micro-current with the constant current value.
4) When the human body resistor is wet or the like (i.e., the resistance is reduced), the first threshold voltage VREF1<OA_OUT, and the second threshold voltage VREF2<OA_OUT, so that the first comparator U4 outputs a high level signal and the second comparator U6 outputs a low level signal to enable the OR gate to output the high level signal VFB. At this time, the boosting module U2 does not work, the output voltage VCC HV slowly falls until the first threshold voltage VREF1>OA_OUT and the second threshold voltage VREF2<OA_OUT, and the circuit returns to the situation 2) to continue working.
5) When the human body resistor changes again, the circuit keeps cycling among the situation 2), the situation 3), and the situation 4) until the human body resistor leaves, and then the circuit returns to the situation 1).
6) When the output voltage VCC HV is greater than the third threshold voltage VREF3, VCC HV*R14/(R13+R14)>VREF3, and the third comparator outputs a high-level signal HV_LIMIT. The OR gate outputs the high signal VFB, and the voltage boosting module U2 does not boost the output voltage VCC HV.
7) When the output voltage VCC HV is less than the third threshold voltage VREF3, the third comparator outputs a low level signal HV_LIMIT.
8) When the micro-current circuit reaches a set constant current value, OA_OUT>VREF1, the first comparator U4 outputs a high level signal to a switch tube Q1 of an indicator light module, the switch tube Q1 is controlled to be turned on, and an indicator light is turned on.
9) When the micro-current circuit does not reach the set constant current value, OA_OUT<VREF1, the first comparator U4 outputs a low level signal to the switch tube Q1 of the indicator light module, the switch tube Q1 is controlled to be turned off, and the indicator light is turned off.

It should be noted that, for the human body, a safe current is below 10 mA, and the set constant current value is set to be only 50-1000 μA, so the micro-current output by the constant current output circuit is very safe.

Embodiment 2

Figure 4:
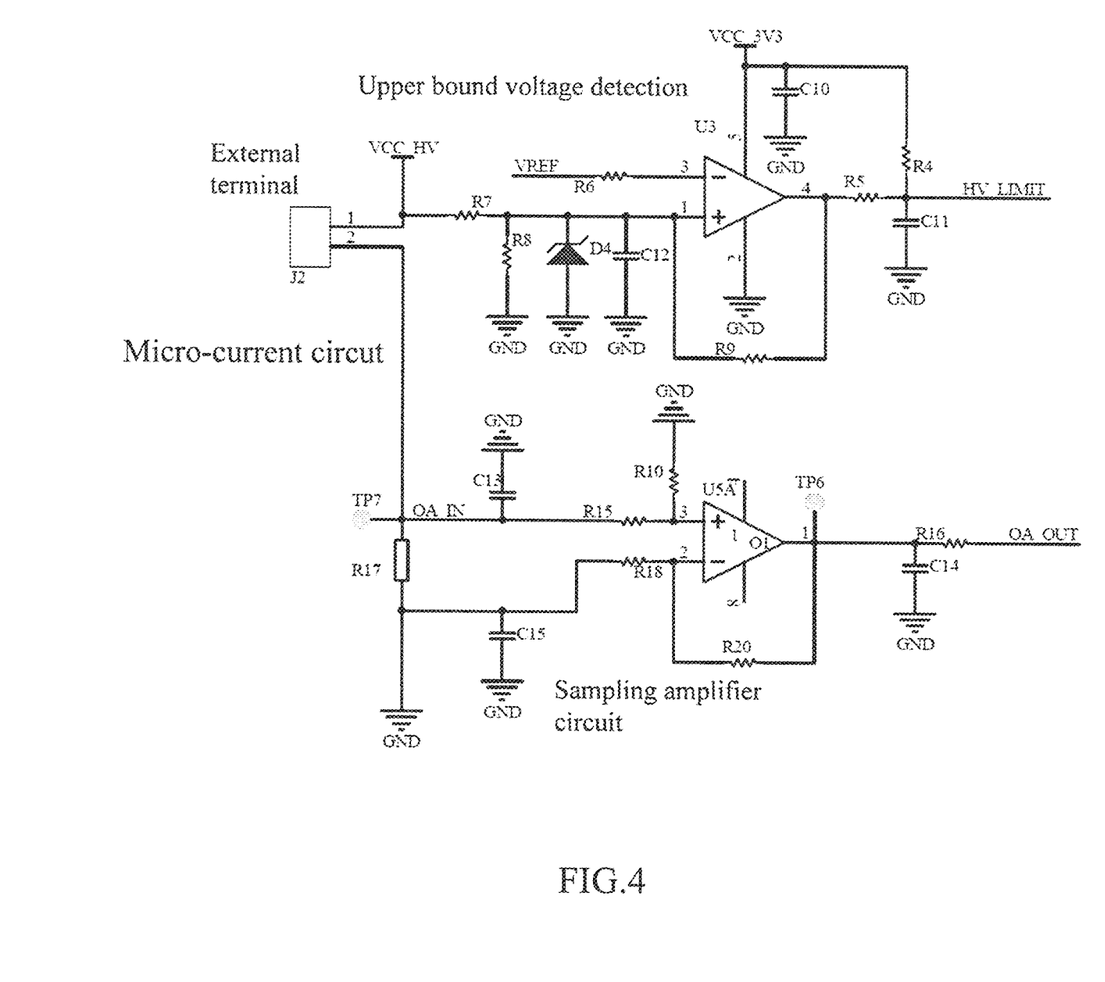
FIG. 4 illustrates a circuit diagram of a detection part of a constant current output circuit in Embodiment 2 of the present disclosure.
Figure 5:
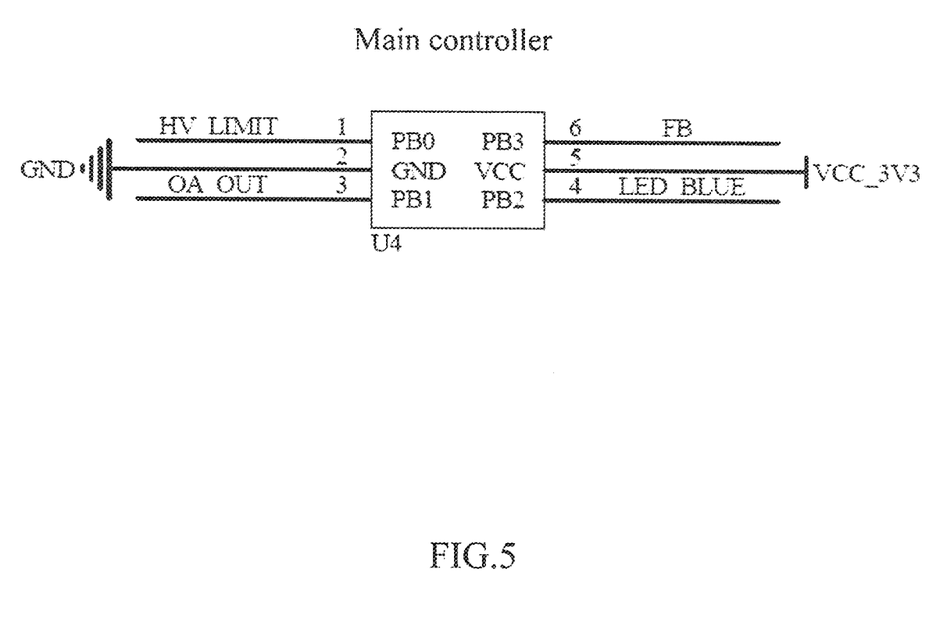
FIG. 5 illustrates a circuit diagram of a single chip microcomputer part in Embodiment 2 of the present disclosure.
Figure 6:
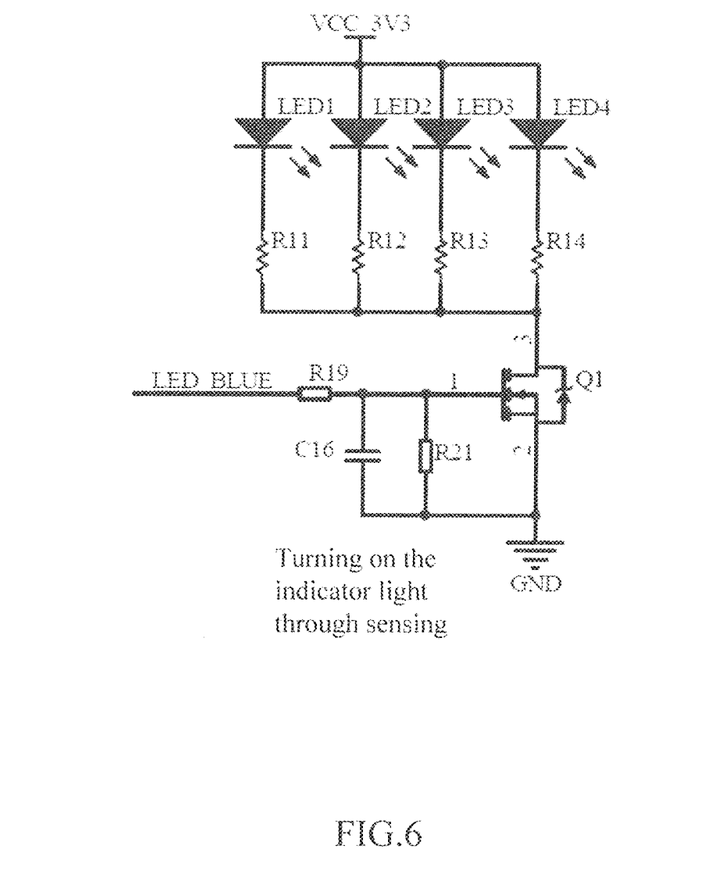
FIG. 6 illustrates a circuit diagram of an indicator light part in Embodiment 2 of the present disclosure.

Referring to FIGS. 4-6, Embodiment 1 achieves a comparison between the sample voltage and a threshold voltage by comparators, and belongs to a pure hardware mode. A sampling software mode of Embodiment 2 is provided to achieve the above-mentioned function, and specifically, the logic controller is a single chip microcomputer U4. An input terminal of the single chip microcomputer U4 is connected to the sample voltage, and an output terminal of the single chip microcomputer U4 is connected to the voltage boosting module U2. The effect of Embodiment 1 can also be achieved by comparing an ADC (Analog-to-Digital Converter) value of the sample voltage read by the single chip microcomputer U4 with a preset threshold voltage.

Meanwhile, the input terminal of the single chip microcomputer U4 is also connected to the output voltage VCC HV and is configured to compare the output voltage VCC HV with a third threshold voltage VREF3 to judge whether the output voltage VCC HV reaches an upper bound voltage.

When working, the following situations are presented.
1) When the human body resistor is not connected, the single chip microcomputer U4 detects that OA_OUT is 0V, then a terminal FB of the single chip microcomputer U4 outputs a high level signal, and the voltage boosting module U2 does not boost the output voltage VCC HV.
2) When the human body resistor is connected (i.e., the resistance is increased), the single chip microcomputer U4 detects a tiny voltage difference that is smaller than a first threshold voltage, the terminal FB outputs a low level signal, the voltage boosting module U2 continuously boosts the output voltage VCC HV, and the micro-current in the micro-current circuit is continuously increased.
3) When the micro-current in the human body resistor reaches a constant current value, the single chip microcomputer U4 detects that OA_OUT is equal to the first threshold voltage, then FB outputs 3.3V. At the moment, U2 does not boost the output voltage any more, and the micro-current in the micro-current circuit keeps the constant current value.

4) When the human body resistor is wet or the like (i.e., the resistance is reduced), the single chip microcomputer U4 detects that OA_OUT is greater than the first threshold voltage, and then the terminal FB outputs a high level signal. At this time, the voltage boosting module U2 does not boost the output voltage, the output voltage VCC HV slowly falls until of OA_OUT is less than the first threshold voltage, and the circuit returns to the situation 2 to continue working.

5) When the human body resistor changes again, the circuit keeps cycling among the situation 2), the situation 3), and the situation 4) until the human body resistor leaves, and then the circuit returns to the situation 1).

6) When the output voltage VCC HV is greater than the third threshold voltage which is set by a user, a terminal HV_LIMIT outputs a high level signal at this time, the terminal FB outputs a high level signal at this time, and the voltage boosting module U2 no longer boosts the output voltage.

7) When the output voltage VCC HV is less than the third threshold voltage, the terminal HV_LIMIT outputs a low level signal.

8) When the micro-current in the micro-current circuit reaches a set constant current value, a terminal LED_BLUE outputs a high level signal to a control electrode of a switch tube Q1 of an indicator light module, the switch tube Q1 is controlled to be turned on, and the indicator light is turned on.

9) When the micro-current in the micro-current circuit does not reach the set constant current value, the terminal LED_BLUE outputs a low level signal to the control electrode of the switch tube Q1 of the indicator light module, the switch tube Q1 is controlled to be turned off, and the indicator light is turned off.

Embodiment 3

Referring to FIG. 7, the present disclosure also provides a micro-current shower head using the constant current output circuit configured for the micro-current. The first terminal of the external terminal J2 is connected to a water output flow of a shower head, and the second terminal of the external terminal J2 is connected to the human body. When water covers a human body surface, the first terminal and the second terminal are connected together to generate the micro-current.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A constant current output circuit configured for a micro-current, comprising:
   a voltage boosting module,
   a logic controller, and
   a resistance access detection module, wherein:
   an input terminal of the voltage boosting module is connected to a power source,
   an output terminal of the logic controller is connected to the input terminal of the voltage boosting module,
   the logic controller is configured to compare a sample voltage generated by the micro-current on a sampling resistor with a first threshold voltage,
   when the sample voltage is less than the first threshold voltage, the logic controller drives the voltage boosting module to boost an output voltage until the sample voltage is increased to be greater than the first threshold voltage,
   the logic controller comprises a first comparator,
   the resistance access detection module comprises a second comparator, and
   each of an output terminal of the first comparator and an output terminal of the second comparator is connected to an OR gate.

2. The constant current output circuit configured for the micro-current according to claim 1, further comprising:
   an external terminal, wherein:
   the external terminal comprises a first terminal connected to the output voltage and a second terminal connected to the sampling resistor, and
   the micro-current is generated when the first terminal and the second terminal are conductively connected together through an external conductive medium.

3. The constant current output circuit configured for the micro-current according to claim 2, wherein:
   the resistance access detection module is configured to compare the sample voltage with a second threshold voltage to judge whether the first terminal and the second terminal are electrically connected together through the external conductive medium.

4. The constant current output circuit configured for the micro-current according to claim 1, comprising:
   an upper bound voltage detection module, wherein:
   the upper bound voltage detection module is configured to compare the output voltage with a third threshold voltage to judge whether the output voltage reaches an upper bound voltage.

5. The constant current output circuit configured for the micro-current according to claim 4, wherein:
   the upper bound voltage detection module comprises a third comparator, and
   an output terminal of the third comparator is connected to the OR gate.

6. The constant current output circuit configured for the micro-current according to claim 1, wherein:
   the logic controller is a single chip microcomputer,
   an input terminal of the single chip microcomputer is connected to the sample voltage, and
   an output terminal of the single chip microcomputer is connected to the voltage boosting module.

7. The constant current output circuit configured for the micro-current according to claim 6, wherein:
   the input terminal of the single chip microcomputer is connected to the output voltage and is configured to compare the output voltage with a third threshold voltage to judge whether the output voltage reaches an upper bound voltage.

8. The constant current output circuit configured for the micro-current according to claim 1, comprising:
   an indicator light module, wherein:
   the indicator light module is connected to the output terminal of the logic controller, and when the sample voltage is greater than the first threshold voltage, an indicator light of the indicator light module is turned on.

9. The constant current output circuit configured for the micro-current according to claim 8, wherein:
the indicator light module comprises a switch tube, and a control electrode of the switch tube is connected to the output terminal of the logic controller.

10. A micro-current shower head, comprising:
a shower head body,
a constant current output circuit configured for a micro-current for adjusting an output value of the micro-current, and
a resistance access detection module, wherein:
the constant current output circuit comprises a sampling resistor and a logic controller,
the sampling resistor is connected to an input terminal of the logic controller,
an output terminal of the logic controller is connected to an input terminal of a voltage boosting module,
the logic controller is configured to compare a sample voltage generated by the micro-current on the sampling resistor with a first threshold voltage,
when the sample voltage is less than the first threshold voltage, the logic controller drives the voltage boosting module to boost an output voltage,
the logic controller comprises a first comparator,
the resistance access detection module comprises a second comparator, and
each of an output terminal of the first comparator and an output terminal of the second comparator is connected to an OR gate.

11. The micro-current shower head according to claim 10, wherein:
the constant current output circuit further comprises an external terminal,
the external terminal comprises a first terminal connected to the output voltage and a second terminal connected to the sampling resistor, and
the micro-current is generated when the first terminal and the second terminal are conductively connected together through an external conductive medium.

12. The micro-current shower head according to claim 11, wherein:
the resistance access detection module is configured to compare the sample voltage with a second threshold voltage to judge whether the first terminal and the second terminal are electrically connected together through the external conductive medium.

13. The micro-current shower head according to claim 10, wherein:
the constant current output circuit comprises an upper bound voltage detection module, and
the upper bound voltage detection module is configured to compare the output voltage with a third threshold voltage to judge whether the output voltage reaches an upper bound voltage.

14. The micro-current shower head according to claim 13, wherein:
the upper bound voltage detection module comprises a third comparator, and
an output terminal of the third comparator is connected to the OR gate.

15. The micro-current shower head according to claim 10, wherein:
the logic controller is a single chip microcomputer,
an input terminal of the single chip microcomputer is connected to the sample voltage, and
an output terminal of the single chip microcomputer is connected to the voltage boosting module.

16. The micro-current shower head according to claim 15, wherein:
the input terminal of the single chip microcomputer is connected to the output voltage and is configured to compare the output voltage with a third threshold voltage to judge whether the output voltage reaches an upper bound voltage.

17. The micro-current shower head according to claim 10, wherein:
the constant current output circuit comprises an indicator light module,
the indicator light module is connected to the output terminal of the logic controller, and
when the sample voltage is greater than the first threshold voltage, an indicator light of the indicator light module is turned on.

18. The micro-current shower head according to claim 17, wherein:
the indicator light module comprises a switch tube, and a control electrode of the switch tube is connected to the output terminal of the logic controller.

* * * * *